United States Patent
Chen et al.

(10) Patent No.: US 10,764,131 B2
(45) Date of Patent: Sep. 1, 2020

(54) METHODS OF ADAPTING RECEIVER CONFIGURATION FOR CONTROL CHANNEL RECEPTION BASED ON DATA RECEPTION

(71) Applicant: Telefonaktiebolaget LM Ericsson (publ), Stockholm (SE)

(72) Inventors: Maomao Chen, Arlov (SE); Muhammad Kazmi, Bromma (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 164 days.

(21) Appl. No.: 15/314,234

(22) PCT Filed: Apr. 13, 2016

(86) PCT No.: PCT/EP2016/058151
§ 371 (c)(1),
(2) Date: Nov. 28, 2016

(87) PCT Pub. No.: WO2016/166181
PCT Pub. Date: Oct. 20, 2016

(65) Prior Publication Data
US 2017/0201420 A1    Jul. 13, 2017

Related U.S. Application Data

(60) Provisional application No. 62/146,534, filed on Apr. 13, 2015.

(51) Int. Cl.
*H04L 12/28* (2006.01)
*H04L 12/24* (2006.01)
(Continued)

(52) U.S. Cl.
CPC ....... *H04L 41/0816* (2013.01); *H04B 7/0877* (2013.01); *H04B 17/309* (2015.01);
(Continued)

(58) Field of Classification Search
CPC ..... H04L 41/12; H04L 41/0803; H04L 45/02; H04W 24/02; H04W 84/18
See application file for complete search history.

(56) References Cited

U.S. PATENT DOCUMENTS 8,964,611 B2    2/2015  Das et al.
2005/0020297 A1*  1/2005  Axness ................ H04B 1/525
                                                      455/552.1
(Continued)

FOREIGN PATENT DOCUMENTS

WO    2014110545 A1    7/2014

OTHER PUBLICATIONS

3GPP TS 36.201 V10.0.0 (Dec. 2010), 3rd Generation Partnership Project; Technical Specification Group Radio Access Network; Evolved Universal Terrestrial Radio Access (E-UTRA); LTE physical layer; General description (Release 10), 13 pages.
(Continued)

*Primary Examiner* — Atique Ahmed
(74) *Attorney, Agent, or Firm* — Sage Patent Group

(57) ABSTRACT

A method performed in a wireless device of a cellular communication system is disclosed. The wireless device has a first receiver configuration and a second receiver configuration. The method comprises receiving data over a data channel of the cellular communication system during a first time period. During a second time period, following directly after the first time period, during which no data is received over said data channel, a control channel of the cellular communication system is monitored using the first receiver configuration. During a third time period, following directly after the second time period, and during which no data is received over said data channel, the control channel is monitored using the second receiver configuration. A method in a network node, a wireless device, a network
(Continued)

node, computer program products, and computer-readable media are also disclosed.

38 Claims, 3 Drawing Sheets

(51) Int. Cl.
    *H04B 17/318* (2015.01)
    *H04B 17/373* (2015.01)
    *H04W 52/32* (2009.01)
    *H04B 7/08* (2006.01)
    *H04B 17/309* (2015.01)
    *H04W 72/04* (2009.01)
    *H04B 7/06* (2006.01)

(52) U.S. Cl.
    CPC ......... *H04B 17/318* (2015.01); *H04B 17/373* (2015.01); *H04W 52/325* (2013.01); *H04W 72/0406* (2013.01); *H04B 7/0689* (2013.01)

(56) References Cited

U.S. PATENT DOCUMENTS

| | | | | |
|---|---|---|---|---|
| 2005/0075077 | A1* | 4/2005 | Mach | H04B 1/1027 455/67.13 |
| 2005/0233752 | A1* | 10/2005 | Laroia | H04L 5/0007 455/450 |
| 2009/0137214 | A1* | 5/2009 | Hofmann | H04B 7/022 455/82 |
| 2012/0044870 | A1* | 2/2012 | Mochizuki | H04B 7/024 370/328 |
| 2012/0120860 | A1* | 5/2012 | Chui | H04J 11/0063 370/311 |
| 2013/0051351 | A1* | 2/2013 | Seo | H04J 11/0056 370/329 |
| 2013/0237171 | A1 | 9/2013 | Lindoff et al. | |
| 2013/0251013 | A1* | 9/2013 | Banister | H04L 1/0054 375/224 |
| 2014/0003312 | A1* | 1/2014 | Sergeyev | H04W 52/0209 370/311 |
| 2014/0198699 | A1* | 7/2014 | Makharia | H04W 72/0413 370/311 |
| 2014/0378114 | A1* | 12/2014 | Lim | H04W 8/08 455/418 |
| 2015/0200697 | A1* | 7/2015 | Wang | H04B 1/123 455/310 |
| 2016/0366641 | A1* | 12/2016 | Makharia | H04W 52/0216 |
| 2018/0014347 | A1* | 1/2018 | Nagasaka | H04W 76/28 |

OTHER PUBLICATIONS

3GPP TSG RAN Meeting #66, RP-142263, Maui, Hawaii, USA, Dec. 8-11, 2014, New Work Item proposal : Perf. Part: CRS Interference Mitigation for LTE Homogenous Deployments, 8 pages.
3GPP TSG RAN Meeting #67, RP-150427, Shanghai, China, Mar. 9-12, 2015, New Work Item: LTE DL 4 Rx antenna ports, 9 pages.
PCT International Search Report, dated Aug. 4, 2016, in connection with International Application No. PCT/EP2016/058151, all pages.
PCT Written Opinion, dated Aug. 4, 2016, in connection with International Application No. PCT/EP2016/058151, all pages.

* cited by examiner

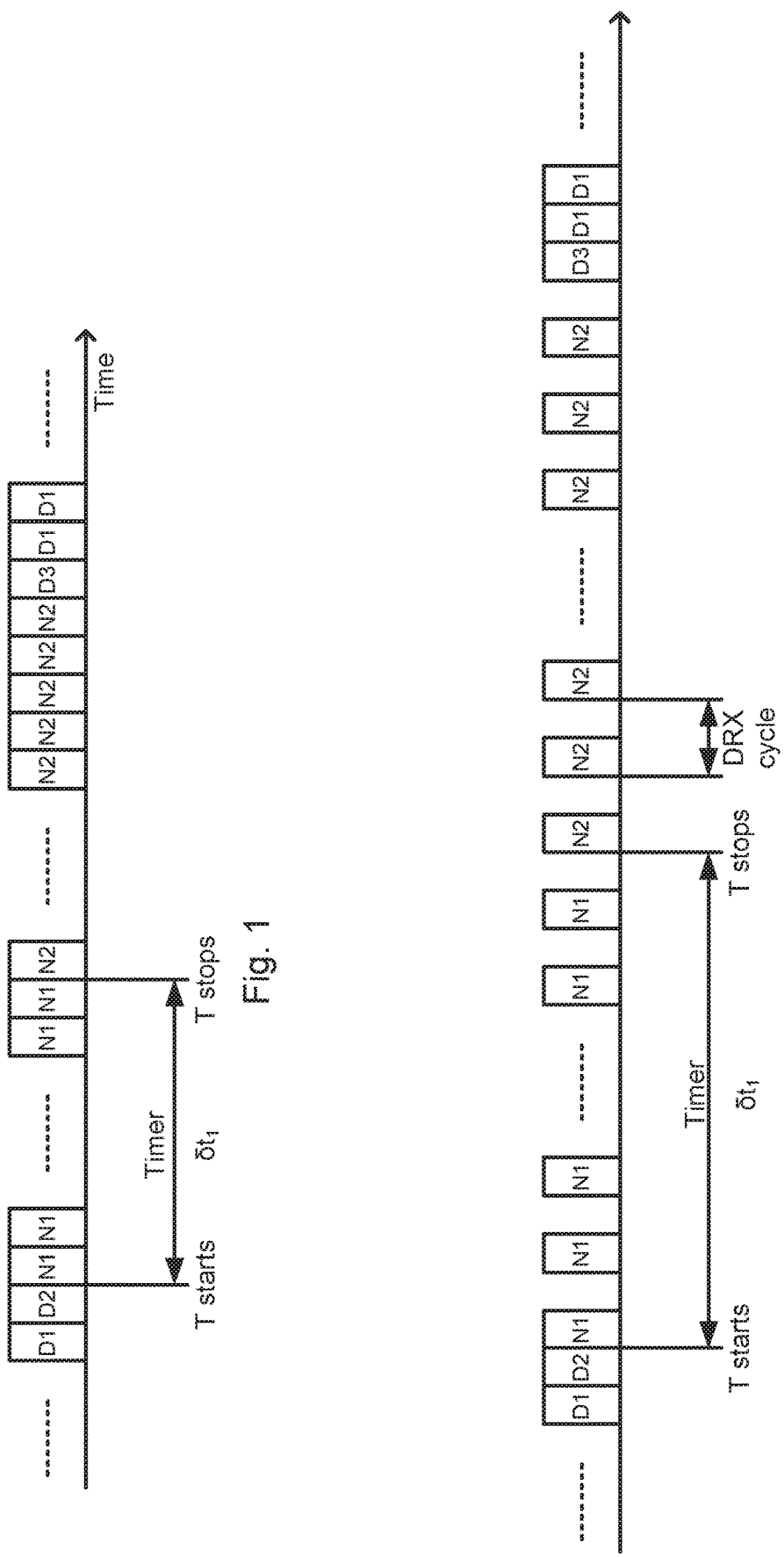

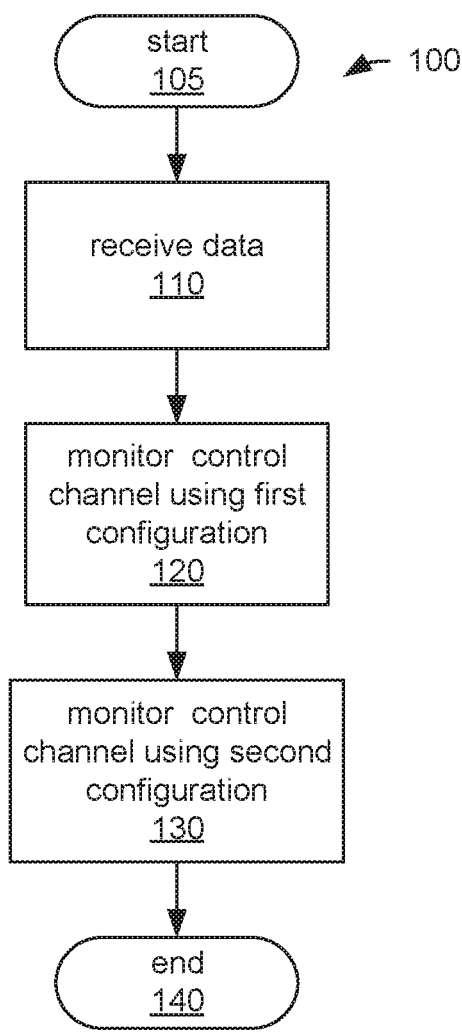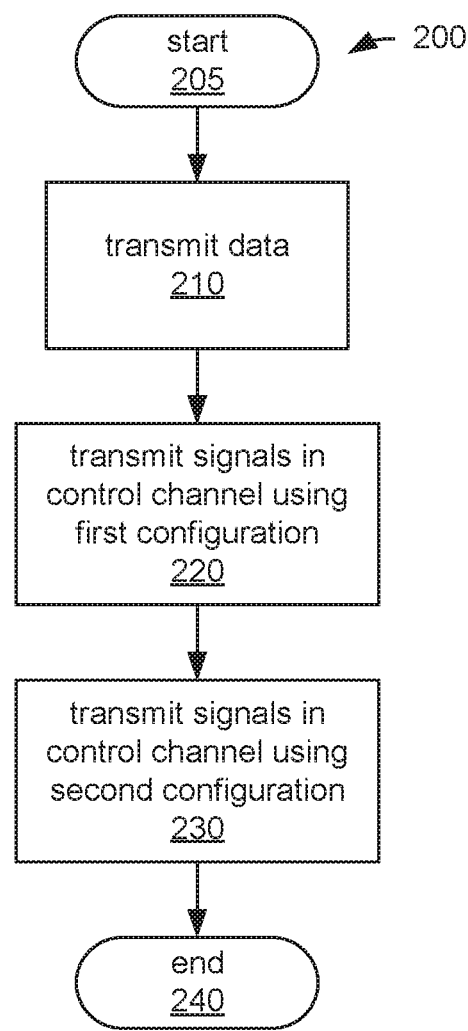
Fig. 3
Fig. 4
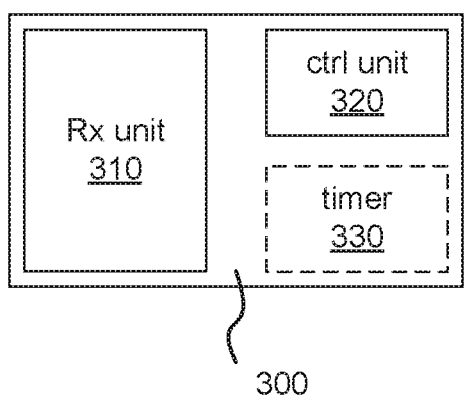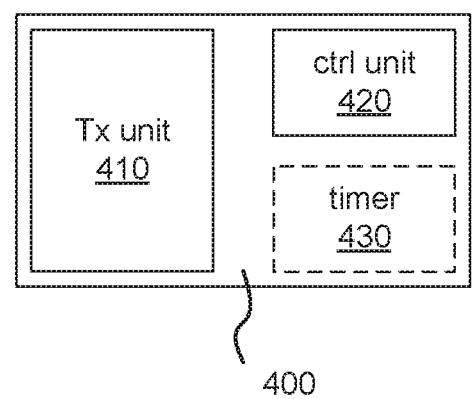
Fig. 5
Fig. 6

METHODS OF ADAPTING RECEIVER CONFIGURATION FOR CONTROL CHANNEL RECEPTION BASED ON DATA RECEPTION

CROSS-REFERENCE TO RELATED APPLICATIONS

This application is a national stage application under 35 U.S.C. § 371 of PCT/EP2016/058151, filed Apr. 13, 2016, which claims the benefit of U.S. Provisional Application No. 62/146,534, filed Apr. 13, 2015, which applications are hereby incorporated herein by reference in their entireties.

TECHNICAL FIELD

The present disclosure relates in general to configuration of receivers in cellular communications systems and related techniques.

BACKGROUND

MIMO Systems

It is well known that MIMO systems can significantly increase the data carrying capacity of wireless systems. Multiple antennas for transmission and reception are used for improving both the user- and cell throughput and are key factors behind the high performance offered by 3GPP (3rd generation partnership program) UE (long-term evolution) standard. Starting from Rel-10 up to 8 layers is supported, see e.g. Sec. 4.2.1 in 3GPP TS 36.201, 3rd Generation Partnership Project; Technical Specification Group Radio Access Network; Evolved Universal Terrestrial Radio Access (E-UTRA); LTE physical layer; General description, Release 10, V10.0.0. However, the UE (User Equipment) performance requirements are still based on the use of 2 receive antenna ports (AP); there are no requirements for a UE that can be equipped with more than two antenna ports for achieving additional diversity gain and/or multiplexing gain.

With 4 Rx (Mx4) MIMO system (e.g. 4×4 MIMO or 8×4 MIMO i.e. M=4 or 8), up to four layer spatial multiplexing is supported. With 4 Rx AP (antenna ports) an 8×4 MIMO system with four layer spatial multiplexing is capable of utilizing both beam forming and diversity gain in maximum level. These layers can be combined through dynamic beamforming and MIMO receiver processing to increase reliability of the received signal at the UE and the range of the UE in the cell. From a performance point of view the use of 4 Rx AP allows higher UE data rates in a wide range of scenarios and improved receiver sensitivity in general. Depending on the target signal quality at the UE (e.g. SNR or SINR region), the transmission scheme (e.g. 4×4 MIMO) used in the network node (e.g. eNodeB) and the channel conditions, the peak user throughput can be doubled compared to dual-layer multiplexing by virtue of additional receiver diversity gain and/or multiplexing gain at the UE. Additionally, due to the improved UE receiver sensitivity, cell coverage may under ideal circumstances be doubled, resulting in fewer blind spots entirely lacking signal reception at the UE The improved UE receiver sensitivity herein means for example that the minimum mean power received at the UE capable of 4 Rx can be lower than that received at the LE capable of less than 4 Rx e.g. 1 Rx or 2 RX.

Note that terminology such as NodeB or eNode B and UE should be considering non-limiting and does in particular not imply a certain hierarchical relation between the two; in general "NodeB" could be considered as device 1 and "UE" device 2, and these two devices communicate with each other over some radio channel. Herein, we also focus on wireless transmissions in the downlink, but some embodiments are equally applicable in the uplink.

The term "network node" is used in some parts of this disclosure as a generic term for bases stations, such as NodeB or eNodeB. Furthermore, the term "wireless device" is used in some parts of this disclosure as a generic term for devices such as UEs.

Interference Mitigation

Interference mitigation is a technique used to at least partly mitigate inter-cell interference. In the UE the inter-cell interference mitigation receiver at least partly mitigates interference caused by the one or more radio signals transmitted by one or more interfering cells aka aggressor cells, neighbor cells etc.

The terms interference mitigation (JIM) receiver, interference cancellation (IC) receiver, interference suppression receiver, interference rejection receiver, interference aware receiver, interference avoidance receiver, or any combination thereof are interchangeably used but they all belong to a category of an advanced receiver or an enhanced receiver, interference cancellation or suppression by such advanced receiver structures can lead to the elimination of the interference, in which case the interference is completely cancelled, whereas in other cases the impact of interference on the useful signal is reduced. Hereinafter for the sake of consistency the term IM is used.

Examples of useful signals, which are intended to be received at the 15E, are data channel (e.g. PDSCH), control channels (e.g. PDCCH, EPDCCH etc), common channel (e.g. PBCH), physical signals such as reference signals or pilot signals (e.g. CRS, PRS, discovery signals, PSS, SSS etc).

Examples of signals or channels whose interference from one or more interfering cells at the TIE can be mitigated by the UE in LTE are PDSCH, PDCCH, PCFICH, PCFICH, EPDCCH, PBCH, CRS, PRS, etc. Examples of signals or channels whose interference from one or more interfering cells at the UE can be mitigated by the LTE in HSPA are HS-PDSCH, HS-SCCH, P-CPICH, S-CPICH, DPCCH, F-DPCCH, etc.

An example of baseline receiver, which does not mitigate interference from interfering cells, is MMSE-MRC.

Examples of IM receivers which can be used for mitigating interference caused by data or control channels (e.g. PDSCH, PDCCH/PCFICH) transmissions in one or more interference cells are MMSE-IRC, E-MMSE-IRC, R-ML, CWIC, iterative ML, etc.

Examples of IM receivers which can be used for mitigating interference caused by physical signals (e.g. discovery signals, CRS, PSS, PRS, SSS etc) transmissions in one or more interference cells are reference signal IM such as CRS-IM (aka CRS-IC) etc.

In practice the UE may also apply combination of IM receivers to mitigate interference caused by one or more interfering cells. For example a UE may mitigate interference caused by PDSCH as well as CRS transmissions in an interfering cell (e.g. cell2) when receiving a control channel (e.g. PDCCH) from the serving cell (e.g. cell1). As an example the UE may use combination of IM receivers comprising of MMSE-IRC, CWIC and CRS-IM to mitigate interference caused by control/data, PDSCH and CRS transmissions from cell2.

SUMMARY

Embodiments disclosed herein seek to accomplish a reasonable compromise between performance and power consumption.

According to a first aspect, there is provided a method, performed in a wireless device of a cellular communication system. The wireless device has a first receiver configuration and a second receiver configuration, of receiving signals in the cellular communication system. The method comprises, during a first time period, in which data is transmitted to the wireless device over a data channel of the wireless communication system, receiving said data over said data channel of the cellular communication system. The method also comprises, during a second time period, following directly after the first time period, having a duration $\Delta T_1$, and during which no data is received over said data channel, monitoring a control channel of the cellular communication system using the first receiver configuration. Furthermore, the method comprises, during a third time period, following directly after the second time period, and during which no data is received over said data channel, monitoring the control channel using the second receiver configuration.

In some embodiments, the first receiver configuration provides an enhanced reception performance compared with the second receiver configuration.

The wireless device may have a plurality of antenna ports and may be configured to use a first number M of antenna ports in the first receiver configuration and a second number L, smaller than M, of antenna ports in the second receiver configuration.

The wireless device may be configured to apply a certain interference-mitigation technique to a receiver of the wireless device in the first receiver configuration, and to not apply the certain interference-mitigation technique to said receiver in the second receiver configuration.

The duration $\Delta T_1$ may be predetermined.

The duration $\Delta T_1$ may be specified in a standard of the cellular communication system.

The method may comprise receiving information specifying the duration $\Delta T_1$ from a network node of the cellular communication system.

The method may comprise autonomously determining the duration $\Delta T_1$ in the wireless device.

The method may comprise transmitting information specifying the duration $\Delta T_1$ to a network node of the cellular communication system.

The wireless device may comprise a timer. The method may comprise setting the timer to expire after the duration $\Delta T_1$ and starting the timer at the end of the first time period. Furthermore, the method may comprise, while the timer is active, monitoring the control channel using the first receiver configuration, and, in response to expiration of the timer, switching to monitoring the control channel using the second receiver configuration.

According to a second aspect, there is provided a method, performed in a network node of a cellular communication system. The network node has a first transmitter configuration and a second transmitter configuration, of transmitting signals to a wireless device. The method comprises, during a first time period, transmitting data to the wireless device over a data channel of the wireless communication system. The method also comprises during a second time period, following directly after the first time period, having a duration $\Delta T_1$, and during which no data is transmitted to the wireless device over said data channel, transmitting signals over a control channel of the cellular communication system to the wireless device using the first transmitter configuration. Furthermore, the method comprises, during a third time period, following directly after the second time period, and during which no data is transmitted to the wireless device over said data channel, transmitting signals over said control channel to the wireless device using the second transmitter configuration.

In some embodiments, the second transmitter configuration provides an enhanced transmission performance compared with the first transmitter configuration.

The network node may be configured to use a first transmission power level $P_1$ in the first transmitter configuration and a second transmission power level $P_2$, higher than $P_1$, in the second transmitter configuration.

The network node may be configured to use a first aggregation level in the first transmitter configuration and a second aggregation level, higher than the first aggregation level, in the second transmitter configuration.

The duration $\Delta T_1$ may be predetermined.

The duration $\Delta T_1$ may be specified in a standard of the cellular communication system.

The method may comprise transmitting information specifying the duration $\Delta T_1$ to the wireless device.

The method may comprise receiving information specifying the duration $\Delta_1$ from the wireless device.

The network node may comprise a timer. The method may comprise setting the timer to expire after the duration $\Delta T_1$, and starting the timer at the end of the first time period. Furthermore, the method may comprise, while the timer is active, transmitting signals over said control channel to the wireless device using the first transmitter configuration, and, in response to expiration of the timer, switching to transmitting signals over said control channel to the wireless device using the second transmitter configuration.

The method may comprise transmitting information about the first transmitter configuration and the second transmitter configuration to another network node.

According to a third aspect, there is provided a method performed in a cellular communication system. The cellular communication system comprises a network node and a wireless device. The method comprises performing, in the network node, the method according to the second aspect. Furthermore, the method comprises performing, in the wireless device, the method according to the first aspect.

According to a fourth aspect, there is provided a computer program product comprising computer program code for executing the method according to the first aspect when said computer program code is executed by a programmable control unit of the wireless device.

According to a fifth aspect, there is provided a computer readable medium having stored thereon a computer program product comprising computer program code for executing the method according to the first aspect when said computer program code is executed by a programmable control unit of the wireless device.

According to a sixth aspect, there is provided a computer program product comprising computer program code for executing the method according to the second aspect when said computer program code is executed by a programmable control unit of the network node.

According to a seventh aspect, there is provided a computer readable medium having stored thereon a computer program product comprising computer program code for executing the method according to the second aspect when said computer program code is executed by a programmable control unit of the network node.

According to an eighth aspect, there is provided a wireless device for a cellular communication system. The wireless device comprises a receiver unit having a first receiver configuration and a second receiver configuration. The wireless device also comprises a control unit operatively connected to the receiver unit. The control unit is adapted to control the receiver unit to, during a first time period, in which data is transmitted to the wireless device over a data channel of the wireless communication system, receive said data over said data channel of the cellular communication system. Furthermore, the control unit is adapted to control the receiver unit to, during a second time period, following directly after the first time period, having a duration $\Delta T_1$, and during which no data is received over said data channel, monitor a control channel of the cellular communication system using the first receiver configuration. Moreover, the control unit is adapted to control the receiver unit to, during a third time period, following directly after the second time period, and during which no data is received over said data channel, monitor the control channel using the second receiver configuration.

In some embodiments, the first receiver configuration provides an enhanced reception performance compared with the second receiver configuration.

The receiver unit may have a plurality of antenna ports and may be configured to use a first number M of antenna ports in the first receiver configuration and a second number L, smaller than M, of antenna ports in the second receiver configuration.

The receiver unit may be configured to apply a certain interference-mitigation technique to a receiver of the wireless device in the first receiver configuration, and to not apply the certain interference-mitigation technique to said receiver in the second receiver configuration.

The duration $\Delta T_1$ may be predetermined.

The duration $\Delta T_1$ may be specified in a standard of the cellular communication system.

The wireless device may be adapted to receive information specifying the duration $\Delta T_1$ from a network node of the cellular communication system.

The wireless device may be adapted to autonomously determine the duration $\Delta T_1$ in the wireless device.

The wireless device may be adapted to transmit information specifying the duration $\Delta T_1$ to a network node of the cellular communication system.

The wireless device may comprise a timer. The control unit may be adapted to set the timer to expire after the duration $LIT_1$ and start the timer at the end of the first time period. The control unit may be adapted to, while the timer is active, control the receiver unit to monitor the control channel using the first receiver configuration, and, in response to expiration of the timer, control the receiver unit to switch to monitoring the control channel using the second receiver configuration.

According to a ninth aspect, there is provided a network node for a cellular communication system. The network node comprises a transmitter unit having a first transmitter configuration and a second transmitter configuration. Furthermore, the network node comprises a control unit operatively connected to the transmitter unit. The control unit is adapted to control the transmitter unit to, during a first time period, transmit data to a wireless device over a data channel of the wireless communication system. Furthermore, the control unit is adapted to control the transmitter unit to, during a second time period, following directly after the first time period, having a duration $\Delta T_1$, and during which no data is transmitted to the wireless device over said data channel, transmit signals over a control channel of the cellular communication system to the wireless device using the first transmitter configuration. Moreover, the control unit is adapted to control the transmitter unit to, during a third time period, following directly after the second time period, and during which no data is transmitted to the wireless device over said data channel, transmit signals over said control channel to the wireless device using the second transmitter configuration.

In some embodiments, the second transmitter configuration provides an enhanced transmission performance compared with the first transmitter configuration.

The transmitter unit may be configured to use a first transmission power level $P_1$ in the first transmitter configuration and a second transmission power level $P_2$, higher than $P_1$, in the second transmitter configuration.

The transmitter unit may be configured to use a first aggregation level in the first transmitter configuration and a second aggregation level, higher than the first aggregation level, in the second transmitter configuration.

The duration $\Delta T_1$ may be predetermined.

The duration $\Delta T_1$ may be specified in a standard of the cellular communication system.

The network node may be adapted to transmit information specifying the duration $\Delta T_1$ to the wireless device.

The network node may be adapted to receive information specifying the duration $\Delta T_1$ from the wireless device.

The network node may comprise a timer. The control unit may be adapted to set the timer to expire after the duration $\Delta T_1$, and start the timer at the end of the first time period. Furthermore, the control unit may be adapted to control the transmitter unit to, while the timer is active, transmit signals over said control channel to the wireless device using the first transmitter configuration, and, in response to expiration of the timer, switch to transmitting signals over said control channel to the wireless device using the second transmitter configuration.

The network node may be configured to transmit information about the first transmitter configuration and the second transmitter configuration to another network node.

According to a tenth aspect, there is provided a cellular communication system comprising a network node according to the ninth aspect and a wireless device according to the eighth aspect.

BRIEF DESCRIPTION OF THE DRAWINGS

Further objects, features and advantages of embodiments of the disclosure will appear from the following detailed description, reference being made to the accompanying drawings, in which:

FIGS. 1-2 show timing diagrams.
FIGS. 3-4 show flow-charts.
FIGS. 5-6 show block diagrams.

DETAILED DESCRIPTION

Figure 7:
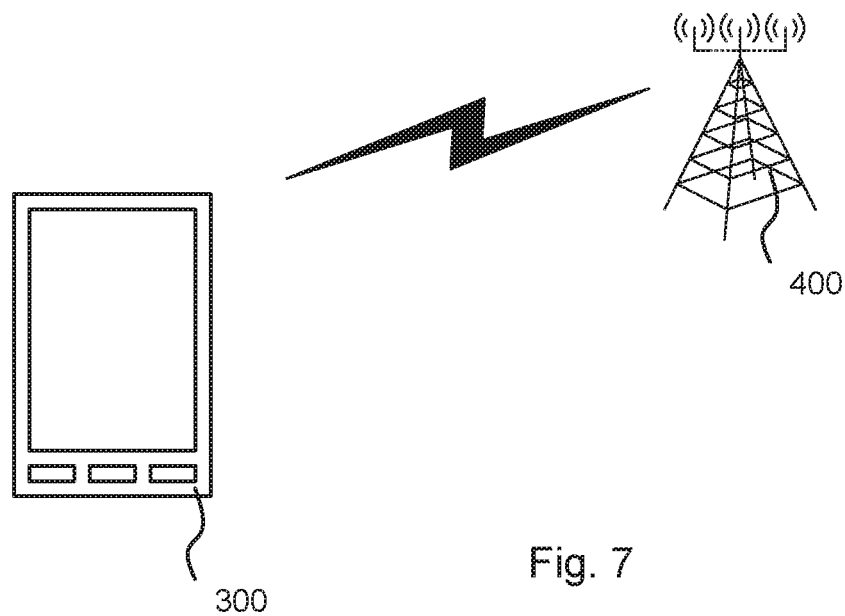
FIG. 7 illustrates part of a communication system.

When 4Rx AP are enabled by the UE for receiving signals then the power consumption, complexity, processing, memory requirements and cost compared to 2 Rx antenna operations are dramatically increased. Such 4Rx capable UE needs to have 2 extra receive chains compared to 2Rx only which will increase the receiver RF power consumption by 40-50% and the baseband processing is increased with higher power consumption too. One of the main benefits of using 4Rx is when the UE uses them for UE demodulation (i.e. for receiving data such as on PDSCH) leading to higher user throughput gain. When the performance gain is big enough the power consumption can be justified by such performance improvement. But when the performance gain cannot be guaranteed or there is no data transmission the power consumption may negatively impact the UE performance (e.g. increase in power consumption, processing etc).

The UE capable of one or more IM receivers may apply them to mitigate inter-cell interference when decoding one or more DL physical channels (e.g. PDSCH, PDCCH) from one or more serving cells. The UE has to monitor one or more DL control channels (e.g. PDCCH, EPDCCH) continuously e.g. in every subframe. Therefore the use of IM mitigation receivers for decoding control channels may dramatically increase the UE power consumption over time. This may also increase UE complexity and would require more memory and processing resources. The UE power consumption and complexity are even further increased when the UE uses multiple receiver antennas (e.g. 4 antennas) and also applies IM receiver(s) on each antenna port for decoding one or more DL control channels. The inventors have therefore realized that a solution which leads to a reasonable compromise between performance enhancement and UE power consumption is needed.

An underlying idea behind some embodiments is that a UE capable of multiple receivers (e.g. 4 Rx) and/or one or more inter-cell IM receivers (e.g. CRS-IM, PDSCH IM etc) uses one or more second type of receivers (e.g. CRS-IM, MMSE-IRC, CWIC etc) and/or uses larger number of antennas (e.g. 4 Rx) for receiving one or more DL control channels while also receiving data channel and also over at least certain time period after the last data channel reception; otherwise the UE uses fewer antennas (e.g. 2 Rx) and/or non-IM receivers for receiving one or more DL control channels. At the same time, the network node can use lower power to transmit one or more DL control channels when the UE uses larger number of receive antennas and/or one or more IM receivers, and higher power to transmit one or more DL control channels when the UE uses fewer receive antennas and/or non-IM receivers for receiving such control channels. The method in the UE can e.g. be specified as pre-defined rule(s) in the standard.

In some embodiments, a method in a UE capable of multiple receiver antennas and/or having at least one inter-cell IM receiver served by at least a first cell managed by a first network node, comprises the steps of:
  Obtaining information about at least a first monitoring period ($\Delta T_1$) for monitoring at least a first control channel from at least the first serving cell;
  Receiving at least a first data channel from at least the first serving cell in a time resource, n;
  Starting a first timer ($\delta t_1$) from a time resource immediately after the reception of the first data channel for a maximum duration of $\Delta T_1$ (said first timer is initialized upon any subsequent reception of the first data channel);
  Monitoring the first control channel using:
    a first receiver configuration comprising of M receive antennas and/or IM receivers while the first timer $\delta t_1$ is running; and
    a second receiver configuration comprising of L receive antennas and/or non-IM receivers after the expiry of the first timer $\delta t_1$, wherein L<M.

Transmitting (optionally) information about one or more of: the $\Delta T_1$, the first receiver configuration, the second receiver configuration, L and M to the first network node.

In some embodiments, a method in a first network node serving a UE capable of multiple receiver antennas served by at least a first serving cell, comprises the steps of:
  Obtaining information about at least a first monitoring period ($\Delta T_1$) to be used by the UE for monitoring at least a first control channel from at least the first serving cell;
  Transmitting at least a first data channel to the UE in a time resource, n;
  Starting a first timer ($\Delta t_1$) starting from a time resource immediately after the 20 transmission of the first data channel for a maximum duration of $\Delta T_1$ (said first timer is initialized upon the transmission of any subsequent second channel);
  Determining:
    a first radio resource configuration ($R_1$) for transmitting the first control channel to the UE while the first timer $\delta t_1$ is running and during which the UE uses a first receiver configuration comprising of M receive antennas and/or at least one IM capable receiver for the reception of the first control channel, and
    a second radio resource configuration ($R_2$) for transmitting the first control channel to the UE after the expiry of the first timer $\delta t_1$ and during which the UE uses a second receiver configuration comprising of L receive antennas and/or non-IM capable receiver for the reception of the first control channel, wherein L<M;
  Transmitting the first control channel to the UE with configuration, $R_1$, while the timer, $\delta t_1$ is running and with configuration $R_2$ otherwise.

As a particular example:
  $R_1$ is a first transmit power level ($P_1$) used for transmitting the first control channel to the UE while the first timer $\delta t_1$ is running and during which the UE uses a first receiver configuration comprising of M receive antennas and/or at least one IM capable receiver for the reception of the first control channel; and
  $R_2$ is a second transmit power level ($P_2$) for transmitting the first control channel to the UE after the expiry of the first timer $\delta t_1$ and during which the UE uses a second receiver configuration comprising of L receive antennas and/or non-IM capable receiver for the reception of the first control channel, wherein L<M and $P_1$<$P_2$;

In parts of this disclosure, the term "transmitter configuration" is used as a generic term for the above mentioned "radio resource configuration".

Some advantages of some embodiments disclosed herein include:
  The UE can utilize its battery power more efficiently enabling it to have longer battery life while enabling the UE to improvement its performance by using 4 or more Rx antennas.
  The methods ensure consistent and predictable UE behavior when UE adapts its receiver configuration for receiving control channels and/or performing RLM.
  The methods ensure consistent and predictable UE behavior when UE adapts its receiver between IM and non-IM and/or between number of receivers for receiving one or more DL control channels and/or performing RLM.
  The UE can utilize its battery power more efficiently enabling it to have longer battery life while enabling the UE to improvement the decoding performance for receiving one or more DL control channel from one or more serving cells using IM receivers.

The network node can optimize the DL transmit power on for transmitting the DL control thereby minimizing the UE and system performance loss. This in turn enables the network node to achieve a higher system capacity and throughput.

Example of a Scenario for Receiver Adaptation

In some embodiments the non-limiting term radio network node or simply network node is used and it refers to any type of network node serving UE and/or connected to other network node or network element or any radio node from where UE receives signal. Examples of radio network nodes are Node B, base station (BS), multi-standard radio (MSR) radio node such as MSR BS, eNode B, network controller, radio network controller (RNC), base station controller (BSC), relay, donor node controlling relay, base transceiver station (BTS), access point (AP), transmission points, transmission nodes, RRU, RRH, nodes in distributed antenna system (DAS) etc.

In some embodiments the non-limiting term user equipment (UE) is used and it refers to any type of wireless device communicating with a radio network node in a cellular or mobile communication system. Examples of UE are target device, device to device (D2D) UE, machine type UE or UE capable of machine to machine (M2M) communication, PDA, Tablet, mobile terminals, smart phone, laptop embedded equipped (LEE), laptop mounted equipment (LME), USB dongles etc. The term "wireless device" is also used for such UEs.

The embodiments are described in particular for MIMO operation EUTRA/LTE. The embodiments are however applicable to any RAT or multi-RAT system where the UE operates using MEM e.g. UTRA/HSPA, GSM/GERAN, WiFi, WLAN, WiMax, CDMA2000 etc.

The embodiments are applicable to single carrier as well as to multicarrier (MC) or carrier aggregation (CA) operation of the UE in conjunction with at least one inter-cell IM receiver (or simply JIM receiver) at the UE. The term carrier aggregation (CA) is also called (e.g. interchangeably called) "multi-carrier system", "multi-cell operation", "multi-carrier operation", "multi-carrier" transmission and/or reception.

The embodiments are applicable to a UE capable of at least one receive antenna and also apply to UE with two or more receive antennas. The embodiments are also applicable in conjunction with MIMO in which the UE is able to receive and/or transmit data to more than one serving cells using MIMO e.g. 2, 4 or 8 receiver antennas at the UE. For example the UE may apply IM receiver on one receiver antenna port or on plurality of receiver antenna ports or may not apply IM receiver on any of the antenna port (i.e. it may use non-IM receiver on all ports). The terms receive antennas, receive antenna ports, receiver diversity, multiple receivers etc are interchangeably used but all bear the same meaning.

The UE is served by at least one serving cell (aka a first serving cell or simply a primary serving cell), which in turn is managed or served by a first network node. The UE may also be served by plurality of serving cells e.g. a first serving cell such as a PCell, a second serving cell such as a first SCell, a third serving cell such as a second SCell and so on in CA. In dual connectivity a first serving cell may be PCell and a second serving cell may be PSCell and third and additional serving cells may be SCells. Different serving cells may be managed or served by the same first network node or by different network nodes e.g. PCell by the first network node and SCell(s) by a second network node and so on.

The UE reception of signals from the serving cell may also be interfered by signals from one or more interfering cells aka inter-cell interference e.g. UE reception from the first serving cell may be interfered by a first interfering cell. For example when receiving a DL control channel (e.g. PDCCH, EPDCCH) from the first serving cell the UE may receive interference in terms of one or more interfering signals from the first interfering cell. Examples of interfering signals (aka inter-cell interfering signals) are PDSCH, PDCCH, CRS, PSS, SSS etc. The UE may apply one or more 1M receivers to mitigate inter-cell interference received from one or more interfering cells in order to receive one or more control channels from the serving cell; this is called inter-cell interference mitigation (IM) on DL control channel reception.

In some embodiments a term time resource is used. Examples of time resource are time slot, TTI, subframe, symbol, frame, scheduling period, data and/or control channel reception time or instant etc. Typically the UE can be scheduled during each time resource (e.g. subframe) and therefore the UE generally monitors one or more control channels during each time resource for determining if the UE is scheduled or not.

The UE monitors one or more DL controls from at least the first serving cell for example for receiving control signaling or messages such as scheduling grant for UL transmission, DL scheduling information (e.g. assigned MCS, transport format etc), power control commands. HARQ information etc. Examples of control channels are PDCCH, E-PDCCH (aka ePDCCH), PCHCH, PHICH etc. The term monitoring may also interchangeably be called receiving, decoding, demodulating, acquiring control channel. The resource elements containing EPDCCH are more spread over the subframe. Therefore depending on the UE implementation the processing time may expand over the whole subframe for receiving EPDCCH.

The UE is scheduled with the data in DL (i.e. receives data) from on one or more data channels but at least a first data channel (e.g. PDSCH) from at least the first cell. The UE is scheduled data in DL (i.e. receives data) from on one or more data channels but at least one a first data channel (e.g. PDSCH) from at least the first cell. Therefore data reception corresponds to DL PDSCH demodulation in LTE system.

The UE may further implicitly or explicitly monitor one or more DL controls for observing or assessing the radio link quality of the first cell. This procedure may interchangeably be called radio link monitoring (RLM). In explicit assessment of the radio link quality for the purpose of the RLM, the UE directly monitors one or more control channels. In implicit assessment, the UE first estimate signal quality on DL reference signal (e.g. CRS). The UE then uses predefined mapping between the signal quality and the control channel reception quality to determine the radio link quality of one or more control channels. Examples of control channels that can be used for RLM are broadcast channel, PDCCH, E-PDCCH, PCIS ICH etc.

The embodiments in the presentation disclosure may apply to a UE in any RRC state e.g. in RRC idle state as well as in RRC connected state.

Method in UE of Obtaining and Using Control Channel Monitoring Time for Adapting Receiver Configuration In this embodiment the UE obtains information about at least a first monitoring period ($\Delta T_1$), receives at least a first data channel, uses at least these two sets of information for determining when to use a first or a second receiver configuration for monitoring at least a first control channel and monitors the at least the first channel using the determined first or the second receiver configuration.

Examples of the first receiver configuration are one or combination of the following:

Number of receivers above a threshold e.g. 4 or more receivers assuming threshold is 2;

IM receivers aka inter-cell IM receivers i.e. receiver capable of at least partly mitigating interference from at least one interfering cell aka aggressor cell, neighbor cell etc. Examples of IM receivers are CRS-IM, MMSE-IRC, CWIC etc.

Examples of the second receiver configuration are one or combination of the following:

Number of receivers equal to or below a threshold e.g. 2 or one receivers assuming threshold is 2;

Non-IM receivers i.e. receiver not capable of mitigating interference from any interfering cell e.g. MMSE-MRC etc.

The following main steps performed by the UE are described further below:

Obtaining information about control channel monitoring period

Adapting receiver configuration based on obtained monitoring period

Transmitting information about monitoring period and/or receiver configurations to network node Obtaining Information About Control Channel Monitoring Period In this step the UE obtains information about at least the first time period ($\Delta T_1$), which is used by the UE for setting up a first timer ($\delta t_1$). The timer in turn is used for triggering the UE to monitor one or more control channels using a particular receiver configuration as explained in the subsequent section.

The UE receives at least the first data channel from the first serving cell during a time resource, n, (e.g. subframe n). This triggers the UE to initiate or start or activate the first timer in a timer resource immediately after the reception of the first data channel i.e. first timer starts in time resource n+1. The first tinier is set to a maximum value of $\delta t_1$. This means the first timer may expire after a maximum duration of $\Delta T_1$. While the first timer ($\delta t_1$) is running the UE may receive first data channel during one or several time resources i.e. after first the time resource n. Whenever the UE receives the first data channel, the UE initializes the first timer, i.e. set $\delta t_1 = 0$. If for example UE receives also first data channel in time resource n+1 then the first timer is initialized i.e. at the end of n+1 $\delta t_1 = 0$.

The UE may obtain the information about the parameter $\Delta T_1$ based on one or more of:

Pre-defined information;

Message received from a first network node e.g. via RRC signaling and

UE autonomous determination.

In case the UE obtains the above information by more than one means then the UE may use one of the Obtained values and discard the others e.g. consider only the information receives from the first network node.

In one example the same value of the monitoring time period parameter $\Delta T_1$ may be applicable for setting up timers for monitoring plurality of DL control channels; for example such a rule can be pre-defined. In another example different values of the monitoring periods (e.g. $\Delta T_1, \ldots, \Delta T_N$) may be obtained for setting up timers ($\delta t_1, \ldots, \delta t_N$) for monitoring different DL control channels (e.g. first, second, third control channels and so on).

In case the UE has multiple serving cells may obtain and use the monitoring time period parameter in any of the following means:

In one example the same values of the monitoring time period parameter and the corresponding timer values may also apply for monitoring control channels from plurality of serving cells of the UE e.g. on all serving cells or on subset of serving cells.

Alternatively in second example separate values of the monitoring time period parameter and the corresponding timer values may be obtained for monitoring control channels for each serving cell e.g. one value for PCell and another one for SCell.

The UE may use one or more of the following criteria for autonomously determine the monitoring time period parameter:

UE battery life and power consumption: If battery level of the LE is below a threshold (e.g. less than 20%) then the UE may decide to restrict the monitoring time period to a shorter value (e.g. 10 subframes). But if the UE battery level is above a threshold then it may use a longer monitoring time period (e.g. 40 subframes).

Signal measurement level: The UE may decide to restrict the UE may decide to restrict the monitoring time period to a shorter value when the signal measurement (e.g. signal strength and/or signal quality such as RSRP and/or RSRQ) of a serving cell is below a threshold. Otherwise when the signal measurement level is above a threshold then the UE may use a longer monitoring time period. Other examples of signal quality are SINR, SNR, BLER etc.

Type of service: In case of certain type of services such as VOIP the UE is served typically periodically e.g. every 20 or 40 ms. In this case the UE may use a shorter monitoring time period (e.g. 5 subframes). But for services associated with unpredictable traffic pattern the UE may use a larger value of a longer monitoring time period (e.g. 40 or 80 subframes)

Historical scheduling information: The UE may also decide the value of the monitoring time period by taking into account the past DL scheduling pattern (e.g. in the last 100 subframes). For example based on the past history the UE may predict the expected data scheduling pattern in the next few frames. For example if the past pattern reveal that the UE is scheduled sparsely (e.g. in 1-5 subframes every 4th or 5th frame then the LE may use a shorter value of the monitoring time period e.g. 10 subframes. Otherwise it may use a longer monitoring time period e.g. 40 subframes.

Adapting Receiver Configuration Based on Obtained Monitoring Period

In this step based on at least the activity level of the first timer, the UE may decide whether to use:

a first receiver configuration for receiving at least the first control channel, which comprises of M receive antennas and/or one or more IM receivers per receiver antenna or a second receiver configuration, which comprises of L receive antennas and/or non-IM receiver per receiver antenna, for receiving at least the first control channel, where L<M.

As an example L and M can be 2 and 4 respectively. In another example L and M can be 2 and 8 respectively if the UE support 8 receiver antennas.

The parameters L, M, IM receivers and non-IM receivers may be determined by the UE based on one of:

pre-defined values of L, M, IM and non-receivers;

implicit determination of L, M, IM and non-IM receivers based on pre-defined UE performance requirements;
autonomous determination by the UE and
information received from the first network node.

The first control channel (e.g. PDCCH) will carry scheduling information about the data (e.g. MCS etc) and the corresponding first data channel (e.g. PDSCH) will carry the actual DL data scheduled to the UE.

If the first timer is running (i.e. activated) then the UE uses the first receiver configuration otherwise (i.e. if $\delta t_1$ is inactivated or set to 0) it uses the second receiver configuration for receiving at least the first control channel. This means if the UE has recently received data channel (e.g. scheduling grant) then the UE also uses larger number of receive antennas and/or IM receiver(s) on each antenna port to receive the control channels because it is more likely to receive data in the next subsequent subframes e.g. due to retransmissions, emptying all or large part of outstanding data in the buffer etc. This will allow the UE to receive data and control channels typically with the same type of receiver (i.e. in terms of number of antennas and/or IM capability) and lead to consistent reception performance of both types of channels.

FIGS. 1-2 illustrate timing diagrams for two different example scenarios. FIG. 1 illustrates a situation where there are continuous subframes to be monitored by the UE for control channels, FIG. 2 illustrates a situation where control channels are to be monitored in DRX cycles. The boxes labeled Dj and Nj, where j is an integer, denotes subframes in the downlink from a network node, such as an eNodeB or a NodeB, to a UE. The subframes denoted Dj are subframes where data is transmitted from the network node and received by the UE. The subframes denoted Nj are subframes where no data is transmitted by the network node or received by the UE, but where one or more control channels are transmitted by the network node and are to be monitored by the UE.

FIGS. 1-2 illustrate the use of timer $\delta t_1$ to keep track of the monitoring period $\Delta T_1$. The timer $\delta t_1$ is started (T starts) after subframe D2 and expires (T stops) after the period $\Delta T_1$ just before the first N2 subframe. In some embodiments, the UE is not aware during subframe d2 that this is actually subframe D2, i.e. the last subframe of a consecutive number of subframes in which it receives data. It only realizes this after the subframe D2, when it no longer receives any data. In order to start the timer $\delta t_1$ in time, the UE might start (or initialize or reset) the timer $\delta t_1$ directly after each subframe it has received data, i.e. D1, D2, or D3. The label "T starts" in FIGS. 1 and 2, in those cases, only indicates the starting of the timer after subframe D2.

An example of adapting the UE receiver in terms of number of receivers for receiving one or more control channels (CCH) based on data reception and activity level of the first timer is now described with reference to FIG. 1, where there are continuous subframes to be monitored for control channels.

D2: This is the last subframe (of a consecutive number of subframes) in which the LE receives data. The UE uses 4 Rx for both the CCH and data.

N1: This is a subframe with no data reception where the UE monitors the CCH with 4 Rx.

N2: This is a subframe with no data reception where the UE monitors the CCH with 2 Rx.

D3: This is the first subframe in which the UE receives data after inactivity, after expiry of the timer $\delta t_1$. The UE uses 2 Rx for the CCH and 4 Rx for data reception.

D1: This is a subsequent subframe, after D3, in which the UE receives data. The UE uses 4 Rx for both the CCH and data.

Another example of adaptation between IM and non-IM receivers in the UE is now described, again with reference to FIG. 1.

D2: This is the last subframe (of a consecutive number of subframes) UE receives data. The UE uses IM receiver(s) for both the CCH and data.

This is a subframe with no data reception where the UE monitors the CCH with IM receiver(s).

N2: This is a subframe with no data reception where the UE monitors the CCH with non-IM receiver.

D3: This is the first subframe in which the UE receives data after inactivity, after expiry of the timer $\delta t_1$. The UE uses non-IM receiver for the CCH and IM-receiver for data.

D1: This is a subsequent subframe, after D3, in which the UE receives data. The UE uses IM receiver(s) for both the CCH and data.

Another example of adapting the UE receiver for receiving one or more control channels (CCH) based on data reception and activity level of the first timer based on DRX cycles is now described with reference to FIG. 2, where there are DRX cycles to be monitored for control channels for RRC connected mode.

D2: This is the last subframe (of a consecutive number of subframes) in which the UE receives data before the DRX cycles commence. The UE uses first configuration for both the CCH and data.

N1: These are on durations within first DRX cycles with no data reception, where the UE monitors the CCH with first receiver configuration.

N2: These are a on durations within subsequent DRX cycles, after expiry of the timer $\delta t_1$, with no data reception, where the UE monitors the CCH with second receiver configuration.

D3: This is the first subframe in which the UE receives data after the DRX cycles. The UE uses second receiver configuration for the CCH and first receiver configuration for data.

D1: This is a subsequent subframe, after D3, in which the UE receives data. The UE uses first receiver configuration for both the CCH and data.

Transmitting Information About Monitoring Period and/or Receiver Configurations to Network Mode In this step the UE may signal information related to one or more of the following parameters used or are being currently used by the UE to the network node (e.g. first network node and/or to the second network node (e.g. in case of DC)) in case the values of these parameters are autonomously determine by the UE:

First monitoring period;
First timer granularity;
First receiver configuration;
Second receiver configuration.

In one aspect of this embodiment the UE may report said information proactively or autonomously whenever the UE determines any change in the value of any of these parameters, periodically or whenever the UE sends uplink feedback information (e.g. HARQ feedback, measurement report etc).

In another aspect of this embodiment the UE may report said information upon receiving a request from the first and/or the second network node to transmit the said information. In yet another aspect of this embodiment the first UE may be requested by the first and/or the second network node to report said information only if there is any change in the value of any of these parameters for per carrier.

The first UE may report the said information by using higher layer signaling such as via RRC message to the first network node and/or to the second network node. Such information may also be reported in a MAC message.

Examples of first timer granularity are time slot, TTI, subframe, symbol, frame, scheduling period, data and/or control channel reception time or instant etc.

Method in Network Node of Determining and Configuring Control Channel Monitoring Time Period for UE to Adapt Receiver Configuration In this embodiment a network node (e.g. first network node) determines one or more of the following parameters and configures the UE enabling it to adapt its receiver for the reception of at least one DL control channel:

First monitoring period;
First timer granularity;
First receiver configuration;
Second receiver configuration.

The network node may determine only those parameters which are not pre-defined.

The network node may also determine different values of the same type of parameter monitoring period) for different serving cells or use the same parameter value for two or more serving cells of the UE. The network node may also determine different values of the same type of parameter for different type of control channels or use the same parameter value for two or more control channels which are to be received by the UE from the same serving cell.

The network node may also determine one or more parameters (e.g. monitoring period) for assessment of serving cell radio link quality e.g. RLM. The values of these parameters may be the same or different compared to those used for the reception of the control channels.

The network node may use one or more of the following criterion for determining the above parameters:

UE receiver capability: The network node may determine any of the above parameters for a UE provided the UE has at least certain minimum number of receiver antennas (e.g. at least 4) and/or IM receiver(s) capability. The network node may obtain UE receiver capability information in terms of maximum number of supported receivers and/or in terms of inter-cell IM receivers) based on explicit indication received from the UE and/or pre-defined knowledge such as manufacturer's specification and/or based on implicit information such signal quality reports (e.g. CQI reports etc). A UE using larger receivers and/or applying IM receiver(s) for receiving signals will report higher value of CQI compared to UE with fewer receivers and/or when applying non-IM receiver under same radio conditions.

Load: The network node may determine any of the above parameters while taking into account the load which can be expressed in terms of number of UEs in a cell, number of UEs sharing the same control channels etc. For example under higher load (e.g if number of UEs above a threshold) the network node may use longer value of the monitoring time period. This is because several UEs may have to be scheduled in the same time resource. Due to this reason the network node may not be able to boost transmit power of control channel sent to all UEs in the same time resource e.g. same subframe. But under low load the network node may use shorter value of the monitoring time period. This is because under low load (e.g. if number of UEs is below or equal to a threshold) fewer UEs are simultaneously scheduled in the same time resource i.e, in the same subframe. Therefore control channel transmit powers (e.g. PDCCH and PCFICH transmit powers) sent to the UE being scheduled can be more easily boosting (e.g. increased by 1-3 dB as more power will be available) when the UE uses the second receiver configuration i.e. when the timer is not running. Therefore UEs easily received by the control channels.

Usage of other channels for group of UEs: The network node may determine any of the above parameters by taking into account the transmission of channels to plurality of UEs. For example if several UEs need to be scheduled with higher transmit power on control channel PDCCH), then the network node may have to limit the transmit power of control channels to another set of UEs. In this case UEs that cannot be scheduled with higher power may have to be configured with larger value of monitoring period to use first receiver configuration.

The network node may further use one or more additional criteria such as those described above as used by UE for autonomous determination of such parameters for determining the values of the parameters e.g. whether to use first monitoring period as 10 subframes or 40 frames or larger.

The network node may also transmit the determined one or more parameters to another network node e.g. neighboring network node etc.

Method in Network Node of Using Information About Control Channel Monitoring Time and UE Receiver Adaptation for Radio Operation Tasks In this step the network node uses the obtained information related to the following parameters for performing one or more radio operation tasks. Examples of radio operational or radio resource management tasks are:

Adaptation of transmit power on DL control channels: When the UE is using the second receiver configuration (i.e. when the first timer is not running) then the network node may use a second power level ($P_2$) for transmitting the first control channel (e.g. PDCCH). When the LE is using the first receiver configuration (i.e. when the first timer is running) then the network node may use a first power level ($P_1$) for transmitting at least the first control channel (e.g. PDCCH), where $P_1 < P_2$. In one example the UE may also use $P_1$ for other control channels (e.g. PCFICH, PHICH, ePDCCH) when the timer is running and $P_2$ for other control channels when the timer is not running. In another example the UE may use different power level $P_3$ for other control channels (e.g. second control channel such as ePDCCH) when the timer is running and $P_4$ for other control channels when the timer is not running where $P_3 < P_4$. The use of higher transmit power to transmit control channel(s) when the UE uses the second receiver configuration (i.e. fewer receiver antennas) will allow the UE to extend its coverage i.e. can receive control channel even when the serving cell signal strength and/or signal quality are below their respective thresholds. The amount of power change (i.e. difference between $P_1$ and $P_2$ or between $P_3$ and $P_4$ in log scale or their ratio in linear scale) may depend on the number of antennas used by the first and second receiver configurations. For example $P_1$ may be 3 dB smaller than $P_2$ if the number of antennas used in the first and second receiver configurations are 2 and 4respectively. As an example $P_1$ may be 10 dBm whereas $P_2$ may be 13 dBm.

Radio resource management on control channels: The network node may also adapt the CFI and/or aggregation level used on one or more control channels depending upon the 1,1E receiver configuration. For example when the maximum Rx antennas and/or IM receivers (e.g. first receiver configuration) are used by UE then smaller CFI with smaller aggregation level could be applied but otherwise higher aggregation level could be applied to make the UE reception performance more robust. The adaptation of CFI and/or aggregation level can be combined with the adaptation of power level as indicated above.

Sending random data before expiration of timer: The network node (e.g. first network node) may schedule the UE with random data before the expiration of the first timer if the network node intends to keep the UE to continue using maximum capable Rx antennas (M) and/or IM receivers i.e. the first receiver configuration for receiving at least the first control channels.

Transmitting information to other network nodes: The network node may also signal the information related to one or more radio operation tasks performed by the network node to another network node. For example the first network node may send it to the second network node and/or to even a third network node (e.g. neighboring base station such as by serving eNode B to neighboring eNode over X2 interface in LTE) etc. The receiving network node may use the received information for one or more radio tasks.

An example of Tx power adaption in the network node is now described with reference to FIG. 1.

D2: This is the last subframe (of a consecutive number of subframes) in which the network node transmits data. The UE uses first receiver configuration for both the CCH and data.

N1: This is a subframe with no data where the network node uses a first power level P1 on the CCH, and the UE monitors the CCH with the first receiver configuration.

N2: This is a subframe with no data where the network node uses a second power level P2 on the CCH and the UE monitors the CCH with the second receiver configuration.

D3: This is the first subframe in which the network node transmits data after inactivity, after expiry of the timer $\delta t_1$. The UE uses second receiver configuration for the CCH and the first receiver configuration for data.

D1: This is a subsequent subframe, after D3, in which the network node transmits data. The UE uses the first receiver configuration for both the CCH and data.

Another example of TX power adaptation in the network node, based on activity of first timer activity of DRX cycles for RRC connected mode, is now described with reference to FIG. 2.

D2: This is the last subframe (of a consecutive number of subframes) in which the network node transmits data before the DRX cycles commence. The UE uses first configuration for both the CCH and data.

These are on durations within first DRX cycles with no data, where the network node uses a first power level P1 for the CCH. The LTE monitors the CCH with first receiver configuration.

N2: These are a on durations within subsequent DRX cycles, after expiry of the timer $\delta t_1$, with no data, where the network node uses a second power level P2 on the CCH. The UE monitors the CCH with second receiver configuration.

D3: This is the first subframe in which the network node transmits data after the DRX cycles. The UE uses second receiver configuration for the CCH and first receiver configuration for data.

D1: This is a subsequent subframe, after D3, in which the network node transmits data. The UE uses first receiver configuration for both the CCH and data.

As has been described above, the UE could use fewer Rx antennas (e.g. 2) and/or non-IM receiver than its maximum capability (e.g. 4 Rx and/or IM capability) for receiving control channels provided that the UE has not received data during the last certain time period. This enables the UE to save its battery power. The network could also use this information (e.g. pre-defined UE behavior) to adapt one or more parameters related to radio resource configuration used for transmitting control channels to the UE. For example the network node may boost transmit power on one or more DL control channels when the UE uses fewer receivers and/or non-IM receiver for control channel reception. This enables the UE to retain its coverage regardless of whether the UE uses; fewer receivers and/or non-IM receiver, or maximum or larger receiver antennas and/or IM receivers for the DL control channel reception.

Description of Flow Charts

FIGS. 3-4 show flowcharts generically illustrating methods according to embodiments disclosed herein. FIG. 3 is a flowchart of a method 100, performed in a wireless device (above denoted "UE") of a cellular communication system, of receiving signals in the cellular communication system. The wireless device has a first receiver configuration and a second receiver configuration. Operation of the method 100 is started in step 105. The method 100 comprises, during a first time period, in which data is transmitted to the wireless device over a data channel of the wireless communication system, receiving said data over said data channel of the cellular communication system. This is illustrated in FIG. 3 with step 110. The first time period corresponds in FIGS. 1-2 to the period with the subframes labeled D1-D3. Furthermore, the method 100 comprises, during a second time period, following directly after the first time period, having a duration $\Delta T_1$, and during which no data is received over said data channel, monitoring a control channel of the cellular communication system using the first receiver configuration. This is illustrated in FIG. 3 with step 120. The second time period corresponds in FIGS. 1-2 to the period with the subframes labeled N1. The method 100 also comprises, during a third time period, following directly after the second time period, and during which no data is received over said data channel, monitoring the control channel using the second receiver configuration. This is illustrated in FIG. 3 with step 130. The third time period corresponds in FIGS. 1-2 to the period with the subframes labeled N2.

The operation of the method 100 is ended in step 140. The method 100 can be repeated as necessary or desired, e.g. repeated continually.

As is described above with reference to FIGS. 1-2, the wireless device should typically monitor the control channel also during the first time period. However, we do not discuss the details of that in this section, but instead focus on generically describing the monitoring of the control channel while no data is received.

As has been touched upon above, the first receiver configuration can provide an enhanced reception performance compared with the second receiver configuration. This could, as has also been touched upon above, come to some cost, e.g. a higher power consumption. Therefore, by switching to the second receiver configuration, power consumption, and/or consumption of other resources, could typically be reduced.

In line with what has been described above, in some embodiments, the wireless device has a plurality of antenna ports and is configured to use a first number M of antenna ports in the first receiver configuration and a second number L, smaller than M, of antenna ports in the second receiver configuration.

Also in line with what has been described above, in some embodiments the wireless device is configured to apply a certain interference-mitigation technique to a receiver of the wireless device in the first receiver configuration, and to not apply the certain interference-mitigation technique to said receiver in the second receiver configuration.

As has been discussed above, various alternatives are available for setting the duration $\Delta T_1$. The duration $\Delta T_1$ may be predetermined (i.e. determined before the second time period begins).

The duration $\Delta T_1$ may be specified in a standard of the cellular communication system.

The wireless device may receive information specifying the duration $\Delta T_1$ from a network node of the cellular communication system, and set the duration $\Delta T_1$ accordingly. Thus, the network node may transmit information specifying the duration $\Delta T_1$ to the wireless device.

The wireless device may autonomously determine the duration $\Delta T_1$, in which case the wireless device may transmit information specifying the duration $\Delta T_1$ to a network node of the cellular communication system. Thus, the network node may receive information specifying the duration $\Delta T_1$ from the wireless device.

Some embodiments described above with reference to FIGS. 1-2 utilizes a timer to determine when to switch from using the first receiver configuration to using the second receiver configuration for monitoring the control channel. Generically, in such embodiments, the method 100 can be described as comprising setting the timer to expire after the duration $\Delta T_1$, starting the timer at the end of the first time period, while the timer is active, monitoring the control channel using the first receiver configuration, and in response to expiration of the timer, switching to monitoring the control channel using the second receiver configuration.

FIG. 4 is a flowchart of a method 200, performed in a network node (such as a base station) of a cellular communication system, of transmitting signals to a wireless device communication device. The network node has a first transmitter configuration and a second transmitter configuration. The term "transmitter configuration" used in this section includes the term "radio resource configuration" used above. Operation of the method 200 is started in step 205. The method 200 comprises, during the first time period, transmitting data to the wireless device over the data channel of the wireless communication system. This is illustrated in FIG. 4 with the step 210. The method 200 comprises, during the second time period, following directly after the first time period, having the duration $\Delta T_1$, and during which no data is transmitted to the wireless device over said data channel, transmitting signals over the control channel of the cellular communication system to the wireless device using the first transmitter configuration. This is illustrated in FIG. 4 with step 220. Furthermore, the method 200 comprises, during the third time period, following directly after the second time period, and during which no data is transmitted to the wireless device over said data channel, transmitting signals over said control channel to the wireless device using the second transmitter configuration.

As has been touched upon above, the second transmitter configuration can provide an enhanced transmission performance compared with the first transmitter configuration. Thereby, the network node can, at least to some extent, compensate for a reduced reception performance in the wireless device operating with the second receiver configuration in the third time period (compared with the first receiver configuration used in the second time period).

For example, the network node may be configured to use a first transmission power level $P_1$ in the first transmitter configuration and a second transmission power level $P_2$, higher than $P_1$, in the second transmitter configuration. Alternatively or additionally, the network node may be configured to use a first aggregation level in the first transmitter configuration and a second aggregation level, higher than the first aggregation level, in the second transmitter configuration.

As indicated above, the method may also comprise transmitting information about the first transmitter configuration and the second transmitter configuration to another network node.

Some embodiments described above with reference to FIGS. 1-2 utilizes a timer to determine when to switch from using the first transmitter configuration to using the second transmitter configuration for sending signals to the wireless device over the control channel. Generically, in such embodiments, the method 200 can be described as comprising setting the timer to expire after the duration $\Delta T_1$, starting the timer at the end of the first time period, while the timer is active, transmitting signals over said control channel to the wireless device using the first transmitter configuration, and in response to expiration of the timer, switching to transmitting signals over said control channel to the wireless device using the second transmitter configuration.

On a system level, the methods 100 and 200 can be combined to a method performed in a cellular communication system, wherein the cellular communication system comprises the network node and the wireless device. This method comprises performing the method 200 in the network node and the method 100 in the wireless device.

Description of Block Diagrams

FIGS. 5-6 show block diagrams generically illustrating a wireless device 300 and a network node 400 according to embodiments disclosed herein. FIG. 5 is a simplified block diagram of a wireless device 300 for a cellular communication system according to an embodiment. The wireless device 300 comprises a receiver unit 310 having the above-mentioned first receiver configuration and second receiver configuration. Furthermore, the wireless device 300 comprises a control unit 320 operatively connected to the receiver unit 310. The control unit 320 may be configured to cause the method 100 described above to be performed in the wireless device 300. For example, the control unit 320 can be adapted to control the receiver unit 310 to, during the first time period, in which data is transmitted to the wireless device over the data channel of the wireless communication system, receive said data over said data channel of the cellular communication system. Furthermore, the control unit 320 can be adapted to control the receiver unit 310 to, during the second time period, following directly after the first time period, having a duration $\Delta T_1$, and during which no data is received over said data channel, monitor the control channel of the cellular communication system using the first receiver configuration. Moreover, the control unit 320 can be adapted to control the receiver unit 310 to, during the third time period, following directly after the second time period, and during which no data is received over said data channel, monitor the control channel using the second receiver configuration.

The wireless device 300 may comprise other circuitry, such as a transmitter unit for transmitting signals in the cellular communication system, as well in addition the circuits explicitly shown in FIG. 5.

In line with what has been described above, the receiver unit 310 may have a plurality of antenna ports and be configured to use a first number M of antenna ports in the first receiver configuration and a second number L, smaller than M, of antenna ports in the second receiver configuration.

Also in line with what has been described above, the receiver unit 310 may be configured to apply a certain interference-mitigation technique to a receiver of the wireless device in the first receiver configuration, and to not apply the certain interference-mitigation technique to said receiver in the second receiver configuration. Said receiver may e.g. be a sub-component of the receiver unit 310.

As illustrated in FIG. 5, the wireless device 300 may comprise the above-mentioned timer (denoted with reference number 330 in FIG. 5). In such embodiments, the control unit 320 may be adapted to set the timer 330 to expire after the duration $\Delta T_1$,
start the timer 330 at the end of the first time period,
while the timer 330 is active, control the receiver unit 310 to monitor the control channel using the first receiver configuration, and
in response to expiration of the timer 330, control the receiver unit 310 to switch to monitoring the control channel using the second receiver configuration.

FIG. 6 is a simplified block diagram of a network node 400 (such as a base station) of a cellular communication system according to an embodiment. The network node 400 comprises a transmitter unit 410 having the above-mentioned first transmitter configuration and second transmitter configuration and a control unit 420 operatively connected to the transmitter unit 410. The control unit 420 may be configured to cause the method 200 described above to be performed in the network node 400. For example, the control unit 420 may be adapted to control the transmitter unit 410 to, during the first time period, transmit data to the wireless device 300 over the data channel of the wireless communication system. Furthermore, the control unit 420 may be adapted to control the transmitter unit 410 to, during the second time period, following directly after the first time period, having a duration $\Delta T_1$, and during which no data is transmitted to the wireless device 300 over said data channel, transmit signals over the control channel of the cellular communication system to the wireless device 300 using the first transmitter configuration. Moreover, the control unit 420 may be adapted to control the transmitter unit 410 to, during the third time period, following directly after the second time period, and during which no data is transmitted to the wireless device 300 over said data channel, transmit signals over said control channel to the wireless device 300 using the second transmitter configuration.

The network node 400 may comprise other circuitry, such as a receiver unit for receiving signals in the cellular communication system, as well in addition the circuits explicitly shown in FIG. 6.

In line with what has been described above, the second transmitter configuration may provide an enhanced transmission performance compared with the first transmitter configuration. For example, the transmitter unit 410 may be configured to use a first transmission power level $P_1$ in the first transmitter configuration and a second transmission power level $P_2$, higher than $P_1$, in the second transmitter configuration. Alternatively or additionally, the transmitter unit 410 may be configured to use a first aggregation level in the first transmitter configuration and a second aggregation level, higher than the first aggregation level, in the second transmitter configuration.

As indicated above, the network node 400 may be configured to transmit information about the first transmitter configuration and the second transmitter configuration to another network node.

As illustrated in FIG. 6, the network node 400 may comprise the above-mentioned timer (denoted with reference number 430 in FIG. 6). In such embodiments, the control unit 420 may be adapted to set the timer 430 to expire after the duration $\Delta T_1$;
start the timer 430 at the end of the first time period; and
control the transmitter unit 410 to
while the timer 430 is active, transmit signals over said control channel to the wireless device 300 using the first transmitter configuration; and
in response to expiration of the timer 430, switch to transmitting signals over said control channel to the wireless device 300 using the second transmitter configuration.

FIG. 7 generically illustrates part of a cellular communication system comprising the network node 400 and the wireless device 300.

DESCRIPTION OF FIGURES RELATING TO PROGRAMMABLE CONTROL UNITS

In some embodiments, the control unit 320 may be implemented as a dedicated application-specific hardware unit. Alternatively, said control unit 320, or parts thereof, may be implemented with programmable and/or configurable hardware units, such as but not limited to one or more field-programmable gate arrays (FPGAs), processors, processor circuits, or microcontrollers. Thus, the control unit 320 may be a programmable control unit 320, such as a processor circuit or a processor circuit with a memory circuit. The same goes for the control unit 420; in some embodiments it may be implemented as a dedicated application-specific hardware unit, and in other embodiments it may be a programmable control unit 420, such as a processor circuit or a processor circuit with a memory circuit. Hence, embodiments described herein may be embedded in a computer program product, which enables implementation of the method and functions described herein, e.g. the embodiments of the methods 100 and 200 described with reference to FIGS. 3 and 4.

Figure 8:
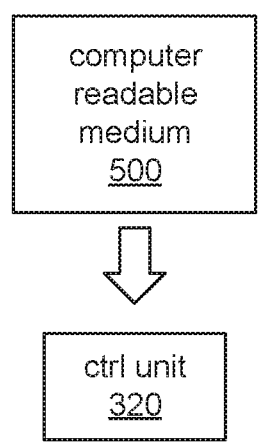
FIGS. 8-9 schematically illustrate computer readable media.

Therefore, according to some embodiments, there is provided a computer program product comprising computer program code for executing the method 100 when said computer program code is executed by the programmable control unit 320 of the wireless device 300. The computer program product may be stored on a computer-readable medium 500 as illustrated in FIG. 8. The computer readable medium 500 may e.g. be a non-transitory computer readable medium.

Figure 9:
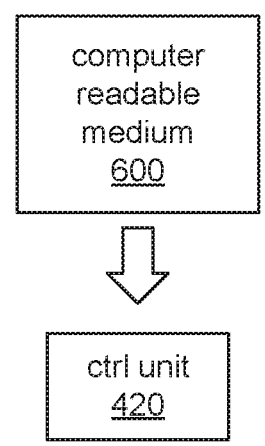

Similarly, according to some embodiments, there is provided a computer program product comprising computer program code for executing the method 200 when said computer program code is executed by the programmable control unit 420 of the network node 400. The computer program product may be stored on a computer-readable medium 600 as illustrated in FIG. 9. The computer readable medium 600 may e.g. be a non-transitory computer readable medium.

The present disclosure has been provided above with reference to specific embodiments. However, other embodiments than the above described are possible within the scope of the disclosure. Different method steps than those described above, performing the method by hardware or software, may be provided within the scope of the disclosure. The different features and steps of the embodiments may be combined in other combinations than those described.

Abbreviations

Some abbreviations used in this disclosure are listed below

MIMO Multiple input multiple output
HSPA High Speed Packet Access
HSDPA High Speed Downlink Packet Access
LTE Long term evolution
HARQ Hybrid automatic repeat request
CRC Cyclic redundancy check
NACK non-acknowledgement
ACK acknowledgement
UE User Equipment
IM Interference mitigation
IC Interference cancellation
CQI Channel quality information
TTI Transmit Time interval
PRS Positioning Reference Signal
CRS Cell-specific Reference Signal
PSS Primary Synchronization Signal
SSS Secondary Synchronization Signal
PBCH Physical Broadcast Channel
EPDCCH Enhanced PDCCH
PDCCH Physical downlink control channel
PDSCH Physical downlink data channel
HS-PDSCH High-Speed PDSCH
SCCH Synchronization Control Channel
HS-SCCH High-Speed SCCH
PCFICH Physical control format indicator channel
CPICH Common Pilot Channel
P-CPICH Primary CPICH
S-CPICH Secondary CPICH
DPCCH Dedicated Physical Control Channel
F-DPCCH Fractional DPCCH
CFI Control format indicator
RRM Radio resource management
RLM Radio link monitoring
RSRP Reference Signal Received Power
RSRQ Reference Signal Received Quality
CCH Control channels
MMSE Minimum mean square error
MMSE-MRC MMSE-maximum ratio combining
MMSE-IRC MMSE-interference rejection combining
E-MMSE-IRC Enhanced-MMSE-IRC
ML Maximum Likelihood
R-ML Reduced complexity MI
CWIC Code word interference cancellation

The invention claimed is:

1. A method, performed in a wireless device of a cellular communication system, wherein the wireless device has a first receiver configuration and a second receiver configuration, of receiving signals in the cellular communication system, the method comprising:
during a first time period, in which data is transmitted to the wireless device over a data channel of the cellular communication system, receiving said data over said data channel of the cellular communication system;
during a second time period, following directly after the first time period, having a duration $\Delta T_1$, and during which no data is received over said data channel, monitoring a control channel of the cellular communication system using the first receiver configuration; and
during a third time period, following directly after the second time period, and during which no data is received over said data channel, monitoring the control channel using the second receiver configuration;
wherein the wireless device comprises a timer, and the timer is operated by:
setting the timer to expire after the duration $\Delta T_1$;
starting the timer at the end of the first time period;
while the timer is active, monitoring the control channel using the first receiver configuration; and
in response to expiration of the timer, switching to monitoring the control channel using the second receiver configuration, and
wherein the wireless device is configured to apply a certain interference-mitigation technique to a receiver of the wireless device in the first receiver configuration, and to not apply the certain interference-mitigation technique to said receiver in the second receiver configuration.

2. The method according to claim 1, wherein the first receiver configuration provides an enhanced reception performance compared with the second receiver configuration.

3. The method according to claim 1, wherein the wireless device has a plurality of antenna ports and is configured to use a first number M of antenna ports in the first receiver configuration and a second number L, smaller than M, of antenna ports in the second receiver configuration.

4. The method according to claim 1, wherein the duration $\Delta T_1$ is predetermined.

5. The method according to claim 1, wherein the duration $\Delta T_1$ is specified in a standard of the cellular communication system.

6. The method according to claim 1, comprising:
receiving information specifying the duration $\Delta T_1$ from a network node of the cellular communication system.

7. The method according to claim 1, comprising:
autonomously determining the duration $\Delta T_1$ in the wireless device.

8. The method according to claim 7, comprising:
transmitting information specifying the duration $\Delta T_1$ to a network node of the cellular communication system.

9. A method, performed in a network node of a cellular communication system, wherein the network node has a first transmitter configuration and a second transmitter configuration, of transmitting signals to a wireless device, comprising:
during a first time period, transmitting data to the wireless device over a data channel of the cellular communication system;
during a second time period, following directly after the first time period, having a duration $\Delta T_1$, and during which no data is transmitted to the wireless device over said data channel, transmitting signals over a control channel of the cellular communication system to the wireless device using the first transmitter configuration; and
during a third time period, following directly after the second time period, and during which no data is transmitted to the wireless device over said data channel, transmitting signals over said control channel to the wireless device using the second transmitter configuration, wherein the network node comprises a timer, and the timer is operated by:
setting the timer to expire after the duration $\Delta T_1$,
starting the timer at the end of the first time period,
while the timer is active, transmitting signals over said control channel to the wireless device using the first transmitter configuration, and
in response to expiration of the timer, switching to transmitting signals over said control channel to the wireless device using the second transmitter configuration, and wherein the wireless device is configured to apply a certain interference-mitigation technique to a receiver of the wireless device in a first receiver configuration, and to not apply the certain interference-mitigation technique to said receiver in a second receiver configuration.

10. The method according to claim 9, wherein the second transmitter configuration provides an enhanced transmission performance compared with the first transmitter configuration.

11. The method according to claim 9, wherein the network node is configured to use a first transmission power level P1 in the first transmitter configuration and a second transmission power level P2, higher than P1, in the second transmitter configuration.

12. The method according to claim 9, wherein the network node is configured to use a first aggregation level in the first transmitter configuration and a second aggregation level, higher than the first aggregation level, in the second transmitter configuration.

13. The method according to claim 9, wherein the duration $\Delta T_1$ is predetermined.

14. The method according to claim 9, wherein the duration $\Delta T_1$ is specified in a standard of the cellular communication system.

15. The method according to claim 9, comprising:
transmitting information specifying the duration $\Delta T_1$ to the wireless device.

16. The method according to claim 9, comprising:
receiving information specifying the duration $\Delta T_1$ from the wireless device.

17. The method according to claim 9, further comprising transmitting information about the first transmitter configuration and the second transmitter configuration to another network node.

18. A method performed in a cellular communication system, wherein the cellular communication system comprises a network node and a wireless device, the method comprising:
performing, in the network node, the method according to claim 9; and
performing, in the wireless device, a method, wherein the wireless device has a first receiver configuration and a second receiver configuration, of receiving signals in the cellular communication system, the method comprising:
during a first time period, in which data is transmitted to the wireless device over a data channel of the cellular communication system, receiving said data over said data channel of the cellular communication system;
during a second time period, following directly after the first time period, having a duration $\Delta T_1$, and during which no data is received over said data channel, monitoring a control channel of the cellular communication system using the first receiver configuration; and
during a third time period, following directly after the second time period, and during which no data is received over said data channel, monitoring the control channel using the second receiver configuration,
wherein the wireless device comprises a timer, and the timer is operated by:
setting the timer to expire after the duration $\Delta T_1$,
starting the timer at the end of the first time period,
while the timer is active, monitoring the control channel using the first receiver configuration, and
in response to expiration of the timer, switching to monitoring the control channel using the second receiver configuration, and
wherein the wireless device is configured to apply a certain interference-mitigation technique to a receiver of the wireless device in the first receiver configuration, and to not apply the certain interference-mitigation technique to said receiver in the second receiver configuration.

19. A non-transitory computer readable storage medium having stored thereon a computer program product comprising computer program code for executing a method when said computer program code is executed by a programmable control unit of a wireless device of a cellular communication system, wherein the wireless device has a first receiver configuration and a second receiver configuration, of receiving signals in the cellular communication system, the method comprising:
during a first time period, in which data is transmitted to the wireless device over a data channel of the cellular communication system, receiving said data over said data channel of the cellular communication system;
during a second time period, following directly after the first time period, having a duration $\Delta T_1$, and during which no data is received over said data channel, monitoring a control channel of the cellular communication system using the first receiver configuration; and
during a third time period, following directly after the second time period, and during which no data is received over said data channel, monitoring the control channel using the second receiver configuration,
wherein the wireless device comprises a timer, and the timer is operated by:
setting the timer to expire after the duration $\Delta T_1$,
starting the timer at the end of the first time period,
while the timer is active, monitoring the control channel using the first receiver configuration, and
in response to expiration of the timer, switching to monitoring the control channel using the second receiver configuration, and
wherein the wireless device is configured to apply a certain interference-mitigation technique to a receiver of the wireless device in the first receiver configuration, and to not apply the certain interference-mitigation technique to said receiver in the second receiver configuration.

20. A non-transitory computer readable storage medium having stored thereon a computer program product comprising computer program code for executing a method when said computer program code is executed by a programmable control unit of a network node of a cellular communication system, wherein the network node has a first transmitter configuration and a second transmitter configuration, of transmitting signals to a wireless device, comprising:

during a first time period, transmitting data to the wireless device over a data channel of the cellular communication system;

during a second time period, following directly after the first time period, having a duration $\Delta T_1$, and during which no data is transmitted to the wireless device over said data channel, transmitting signals over a control channel of the cellular communication system to the wireless device using the first transmitter configuration; and during a third time period, following directly after the second time period, and during which no data is transmitted to the wireless device over said data channel, transmitting signals over said control channel to the wireless device using the second transmitter configuration, wherein the network node comprises a timer, and the timer is operated by:
setting the timer to expire after the duration $\Delta T_1$,
starting the timer at the end of the first time period,
while the timer is active, transmitting signals over said control channel to the wireless device using the first transmitter configuration, and
in response to expiration of the timer, switching to transmitting signals over said control channel to the wireless device using the second transmitter configuration, and wherein the wireless device is configured to apply a certain interference-mitigation technique to a receiver of the wireless device in a first receiver configuration, and to not apply the certain interference-mitigation technique to said receiver in a second receiver configuration.

21. A wireless device for a cellular communication system, comprising:

a receiver unit having a first receiver configuration and a second receiver configuration; and a control unit operatively connected to the receiver unit; wherein the control unit is adapted to control the receiver unit to:

during a first time period, in which data is transmitted to the wireless device over a data channel of the cellular communication system, receive said data over said data channel of the cellular communication system;

during a second time period, following directly after the first time period, having a duration $\Delta T_1$, and during which no data is received over said data channel, monitor a control channel of the cellular communication system using the first receiver configuration; and during a third time period, following directly after the second time period, and during which no data is received over said data channel, monitor the control channel using the second receiver configuration, wherein the wireless device comprises a timer, and the control unit is adapted to:
set the timer to expire after the duration $\Delta T_1$,
start the timer at the end of the first time period,
while the timer is active, monitor the control channel using the first receiver configuration, and
in response to expiration of the timer, switch to monitor the control channel using the second receiver configuration, and wherein the wireless device is configured to apply a certain interference-mitigation technique to a receiver of the wireless device in the first receiver configuration, and to not apply the certain interference-mitigation technique to said receiver in the second receiver configuration.

22. The wireless device according to claim 21, wherein the first receiver configuration provides an enhanced reception performance compared with the second receiver configuration.

23. The wireless device according to claim 21, wherein the receiver unit has a plurality of antenna ports and is configured to use a first number M of antenna ports in the first receiver configuration and a second number L, smaller than M, of antenna ports in the second receiver configuration.

24. The wireless device according to claim 21, wherein the duration $\Delta T_1$ is predetermined.

25. The wireless device according to claim 21, wherein the duration $\Delta T_1$ is specified in a standard of the cellular communication system.

26. The wireless device according to claim 21, wherein the wireless device is adapted to receive information specifying the duration $\Delta T_1$ from a network node of the cellular communication system.

27. The wireless device according to claim 21, wherein the wireless device is adapted to autonomously determine the duration $\Delta T_1$ in the wireless device.

28. The wireless device according to claim 27, wherein the wireless device is adapted to transmit information specifying the duration $\Delta T_1$ to a network node of the cellular communication system.

29. A network node for a cellular communication system, comprising:

a transmitter unit having a first transmitter configuration and a second transmitter configuration; and a control unit operatively connected to the transmitter unit; wherein the control unit is adapted to control the transmitter unit to:

during a first time period, transmit data to a wireless device over a data channel of the cellular communication system;

during a second time period, following directly after the first time period, having a duration $\Delta T_1$, and during which no data is transmitted to the wireless device over said data channel, transmit signals over a control channel of the cellular communication system to the wireless device using the first transmitter configuration; and during a third time period, following directly after the second time period, and during which no data is transmitted to the wireless device over said data channel, transmit signals over said control channel to the wireless device using the second transmitter configuration;

wherein the network node comprises a timer, and the control unit is adapted to:
set the timer to expire after the duration $\Delta T_1$;
start the timer at the end of the first time period;
while the timer is active, transmitting signals over said control channel to the wireless device using the first transmitter configuration, and
in response to expiration of the timer, switch to transmit signals over said control channel to the wireless device using the second transmitter configuration, and wherein the wireless device is configured to apply a certain interference-mitigation technique to a receiver of the wireless device in the first receiver configuration, and to not apply the certain interference-mitigation technique to said receiver in the second receiver configuration.

30. The network node according to claim 29, wherein the second transmitter configuration provides an enhanced transmission performance compared with the first transmitter configuration.

31. The network node according to claim 29, wherein the transmitter unit is configured to use a first transmission power level P1 in the first transmitter configuration and a second transmission power level P2, higher than P1, in the second transmitter configuration.

32. The network node according to claim 29, wherein the transmitter unit is configured to use a first aggregation level in the first transmitter configuration and a second aggregation level, higher than the first aggregation level, in the second transmitter configuration.

33. The network node according to claim 29, wherein the duration $\Delta T_1$ is predetermined.

34. The network node according to claim 29, wherein the duration $\Delta T_1$ is specified in a standard of the cellular communication system.

35. The network node according to claim 29, wherein the network node is adapted to transmit information specifying the duration $\Delta T_1$ to the wireless device.

36. The network node according to claim 29, wherein the network node is adapted to receive information specifying the duration $\Delta T_1$ from the wireless device.

37. The network node according to claim 29, wherein the network node is configured to transmit information about the first transmitter configuration and the second transmitter configuration to another network node.

38. A cellular communication system comprising a network node according to claim 29 and a wireless device comprising:

a receiver unit having a first receiver configuration and a second receiver configuration; and
a control unit operatively connected to the receiver unit;
  wherein the control unit is adapted to control the receiver unit to:
    during a first time period, in which data is transmitted to the wireless device over a data channel of the cellular communication system, receive said data over said data channel of the cellular communication system;
    during a second time period, following directly after the first time period, having a duration $\Delta T_1$, and during which no data is received over said data channel, monitor a control channel of the cellular communication system using the first receiver configuration;
    during a third time period, following directly after the second time period, and during which no data is received over said data channel, monitor the control channel using the second receiver configuration; and
  wherein the wireless device comprises a timer, and the control unit is adapted to:
    set the timer to expire after the duration $\Delta T_1$,
    start the timer at the end of the first time period,
    while the timer is active, monitor the control channel using the first receiver configuration, and
    in response to expiration of the timer, switch to monitor the control channel using the second receiver configuration, and
  wherein the wireless device is configured to apply a certain interference-mitigation technique to a receiver of the wireless device in the first receiver configuration, and to not apply the certain interference-mitigation technique to said receiver in the second receiver configuration.

* * * * *